United States Patent
Brooks et al.

(10) Patent No.: US 6,477,493 B1
(45) Date of Patent: Nov. 5, 2002

(54) OFF SITE VOICE ENROLLMENT ON A TRANSCRIPTION DEVICE FOR SPEECH RECOGNITION

(75) Inventors: Brian S. Brooks, Lake Worth, FL (US); Waltraud Brunner, Vienna (AT); Carmi Gazit, Boulder, CO (US); Arthur Keller, Boca Raton, FL (US); Antonio R. Lee, Scarsdale, NY (US); Thomas Netousek, Vienna (AT); Kerry A. Ortega, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/354,412

(22) Filed: Jul. 15, 1999

(51) Int. Cl.[7] .................................................. G10L 17/00

(52) U.S. Cl. ................... 704/246; 704/243; 704/245; 704/251; 704/250; 704/270; 704/260

(58) Field of Search ................................. 704/243, 246, 704/235, 244, 231, 250, 245, 255, 256, 270, 270.1, 275, 272, 273, 251, 260

(56) References Cited

U.S. PATENT DOCUMENTS

| | | | | |
|---|---|---|---|---|
| 5,513,298 A | * | 4/1996 | Stanford et al. | 704/253 |
| 5,615,296 A | * | 3/1997 | Stanford et al. | 704/270 |
| 5,799,278 A | * | 8/1998 | Cobbett et al. | 704/256 |
| 5,818,800 A | * | 10/1998 | Barker | 369/25 |
| 5,953,700 A | * | 9/1999 | Kanevsky et al. | 704/246 |
| 6,064,963 A | * | 5/2000 | Gainsboro | 704/270 |
| 6,122,614 A | * | 9/2000 | Kahn et al. | 704/235 |
| 6,163,768 A | * | 12/2000 | Sherwood et al. | 704/235 |
| 6,212,498 B1 | * | 4/2001 | Sherwood et al. | 704/244 |
| 6,219,640 B1 | * | 4/2001 | Basu et al. | 704/246 |
| 6,233,556 B1 | * | 5/2001 | Teunen et al. | 704/250 |
| 6,275,805 B1 | * | 8/2001 | Fado et al. | 704/270 |

\* cited by examiner

*Primary Examiner*—Vijay B. Chawan
(74) *Attorney, Agent, or Firm*—Akerman Senterfitt

(57) ABSTRACT

A method and system for use with a computer recognition system to enroll a user. The method involves a series of steps. The invention provides a user with an enrollment script. The invention then receives a recording made with a transcription device of a dictation session in which the user has dictated at least a portion of the enrollment script. Additionally, the invention can enroll the user in the speech recognition system by decoding the recording and training the speech recognition system.

15 Claims, 12 Drawing Sheets

Enrollment - Waltraud (First Enrollment)

Selected Enrollment Script: Treasure Island

To enroll on your transcription device, you need to perform the following steps:

74 — 1 [Preview and Print...] You will need a copy of the enrollment script to read to your transcription device. Select this button to load the script into WordPad where you can print it.

76 — 2 [Quick Test...] Before enrolling it is important to record and process the short Quick Test sentences. This will enable the computer to begin learning your voice characteristics and to check the audio quality of your transcript device.

78 — 3 [Import...] Transfer your recording of the enrollment script from the transaction device to the computer. You may need to perform this step multiple times to collect enough data for training.
Note: You must record and import at least <xx> sentences before you can Train (process) your enrollment.

80 — 4 [Train...] Process your recordings to finish your enrollment. This is the final step that improves recognition accuracy. It will take 20-50 minutes. Do not turn your computer off or use ViaVoice until training finishes.

[Help]   [Close]

OFF SITE VOICE ENROLLMENT ON A TRANSCRIPTION DEVICE FOR SPEECH RECOGNITION

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of speech recognition software and more particularly to off site voice enrollment on a transcription device for speech recognition.

2. Description of the Related Art

Speech recognition is the process by which an acoustic signal received by a transducive element, such as a microphone, is converted to a set of text words by a computer. These recognized words may then be used in a variety of computer software applications for purposes such as document preparation, data entry, and command and control. Improvements to speech dictation systems provide an important way to enhance user productivity.

Currently within the art, a user must train a speech recognition system with the user's voice patterns in order to achieve accurate speech recognition. This process is called enrollment. The enrollment process involves user dictation of a body of text into the speech recognition system. This body of text, referred to as an enrollment script, is known to the speech recognition system and may be a short story or a collection of sentences containing particular phonemes. Using acoustic models representing phonemes and a language model containing word groupings and word frequency data, the speech recognition system decodes the user dictation of the enrollment script into text. The system can then analyze the user's dictation of the enrollment script in relation to the known text of the enrollment script. After decoding the user dictation, the speech recognition system can be trained by generating a personal voice model for a particular user. The personal voice model consists of acoustic models that are tailored to a particular user's manner of speaking. The user specific acoustic models can be compared to unknown speech to find a text match for speech analyzed by the speech recognition system. Through this training process, the speech recognition system can thereafter better respond to the particular user's known voice patterns. After a speech recognition system is trained to a particular user's voice patterns, such a system is said to be speaker dependent rather than speaker independent.

The enrollment process works not only to train the speech recognition system to recognize a particular user's voice patterns, but also to train the system to compensate for audio properties of the system's transducive element and a local audio environment in which the speech recognition system is operated. Because most speech recognition systems operate in an unchanging audio environment with the same transducive element, a user need go through the enrollment process only one time. For example, a speech recognition system implemented on a high speed multimedia computer will most likely be used only in the room in which the system is operated. Such systems are not portable and once set up, the audio environment remains constant. Consequently, when the user trains the system through the enrollment process, the system accounts for the audio properties of the microphone and the local audio environment in which the system is operated.

With the widespread use of portable transcription devices, particularly digital transcription devices, it is desirable for speech recognition systems to transcribe a user's dictation from a recording made by such portable devices. The problem arises that the user's transcription device and the unknown audio environment in which dictation is recorded effectively become part of the speech recognition system input path. However, the transcription device and the audio environment have not been characterized. For example, a transcription device has a built in microphone. Such a microphone has unique audio properties that differ from the transducive element which is part of the speech recognition system. Therefore, if a recording is received by a speech recognition system from a transcription device having a microphone with unknown audio properties, then the speech recognition system may not be able to accurately perform speech recognition on the recording.

Presently, some speech recognition systems allow a user to connect a transcription device to the system for use as a microphone in place of the system microphone. Then the user can be enrolled into the system using the transcription device microphone instead of the system microphone. However, this method does not work with all transcription devices, especially devices that cannot function independently as a microphone.

Another problem inherent to using a portable transcription device is that the properties of the distinct audio environment in which such a device is used differ from the properties of the local audio environment where the speech recognition system is operated. The very nature of a portable translation device ensures that it will be used in an audio environment distinct from the local audio environment of the speech recognition system. Consequently, the differing properties of the two audio environments may prevent accurate transcription of a recording. Thus, there has arisen a need for a method of off site or batch voice enrollment of a user using a transcription device.

SUMMARY OF THE INVENTION

The invention concerns a method and a system for enrollment of a user in a speech recognition system. The method of the invention, also referred to as off site or batch enrollment, involves a plurality of steps. The invention provides a user with an enrollment script. Then the system receives a recording made with a transcription device of a dictation session in which the user has dictated at least a portion of the enrollment script. Next, the invention enrolls the user in the speech recognition system by decoding the recording and training the speech recognition system.

According to one aspect of the invention, the dictation session occurs in an audio environment which is distinct from a local audio environment in which the speech recognition system is operated. Further, the recording can be made with a digital voice recorder or an analog voice recorder. Additionally, the method can include the step of comparing the recording to the enrollment script to determine if the recording contains a minimum predetermined percentage of words contained in the enrollment script. Also, the system can enable a user activatable icon for initiating the training process using the recording if the recording contains the minimum predetermined percentage of words.

According to a second aspect, the invention can be a computer speech recognition system for enrollment of a user. In that case, the system includes programming for providing a user with an enrollment script. The system also includes programming for receiving a recording made with a transcription device of a dictation session in which the user has dictated at least a portion of the enrollment script. Further, the system can include programming for enrolling the user in the speech recognition system by decoding the recording and training the speech recognition system.

The dictation session can occur in an audio environment which is distinct from a local audio environment in which the speech recognition system is operated. Additionally, the recording can be made with a digital voice recorder or an analog voice recorder.

Similar to the previously described method, the system can include additional programming for comparing the recording to the enrollment script to determine if the recording contains a minimum predetermined percentage of words contained in the enrollment script. Also, the system can include programming for enabling a user activatable icon for initiating the training process using the recording if the recording contains the minimum predetermined percentage of words.

According to a third aspect, the invention may comprise a machine readable storage, having stored thereon a computer program having a plurality of code sections executable by a machine for causing the machine to perform a series of steps. The machine readable storage can cause the machine to perform the step of providing a user with an enrollment script. Further, the machine readable storage can cause the machine to perform the steps of receiving a recording made with a transcription device of a dictation session in which the user has dictated at least a portion of the enrollment script, and enrolling the user in the speech recognition system by decoding the recording and training the speech recognition system.

The machine readable storage also can be programmed so that the dictation session occurs in an audio environment which is distinct from a local audio environment in which the speech recognition system is operated. Further, the recording can be made with a digital voice recorder or an analog voice recorder.

The machine readable storage can include programming for causing the machine to perform the further step of comparing the recording to the enrollment script to determine if the recording contains a minimum predetermined percentage of words contained in the enrollment script. Also, the machine readable storage can include programming for causing the machine to perform the step of enabling a user activatable icon for initiating the training process using the recording if the recording contains the minimum predetermined percentage of words.

BRIEF DESCRIPTION OF THE DRAWINGS

There are presently shown in the drawings embodiments of which are presently preferred, it being understood, however, that the invention is not so limited to the precise arrangements and instrumentalities shown, wherein.

DETAILED DESCRIPTION OF THE INVENTION

Figure 1:
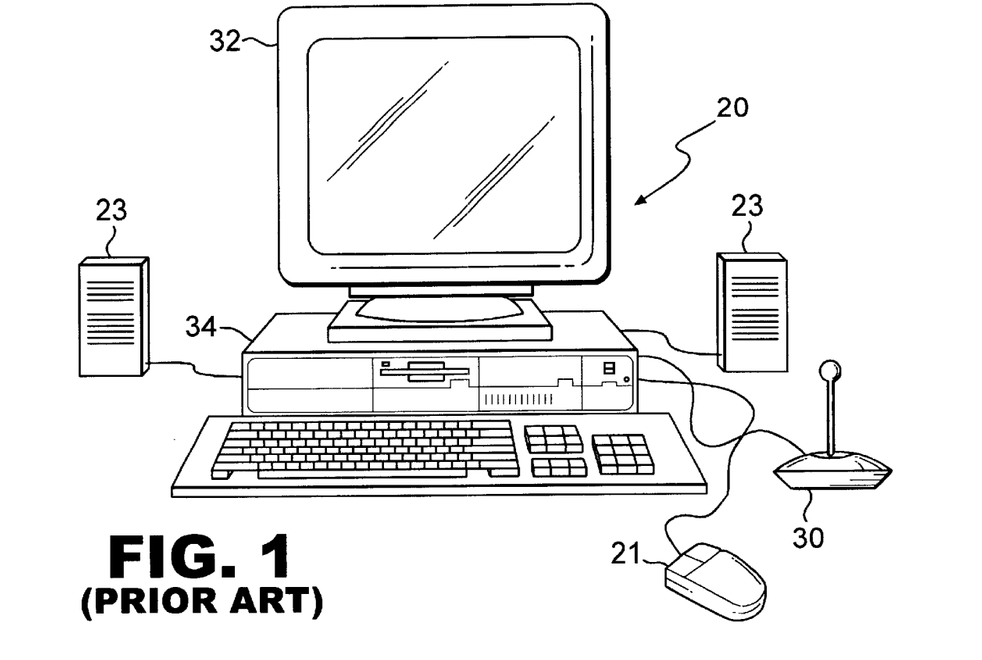
FIG. 1 shows a computer system for speech recognition on which the system of the invention can be used.

FIG. 1 shows a typical computer system 20 for use in conjunction with the present invention. The system is preferably comprised of a computer 34 including a central processing unit (CPU), one or more memory devices and associated circuitry. The system also includes a microphone 30 operatively connected to the computer system through suitable interface circuitry or a "sound board" (not shown), and at least one user interface display unit 32 such as a video data terminal (VDT) operatively connected thereto. The CPU can be comprised of any suitable microprocessor or other electronic processing unit, as is well known to those skilled in the art. An example of such a CPU would include the Pentium or Pentium II brand microprocessor available from Intel Corporation or any similar microprocessor. Speakers 23, as well as an interface device, such as mouse 21, can also be provided with the system, but are not necessary for operation of the invention as described herein.

The various hardware requirements for the computer system as described herein can generally be satisfied by any one of many commercially available high speed multimedia personal computers offered by manufacturers such as International Business Machines Corporation (IBM), Compaq, Hewlett Packard, or Apple Computers.

Figure 2:
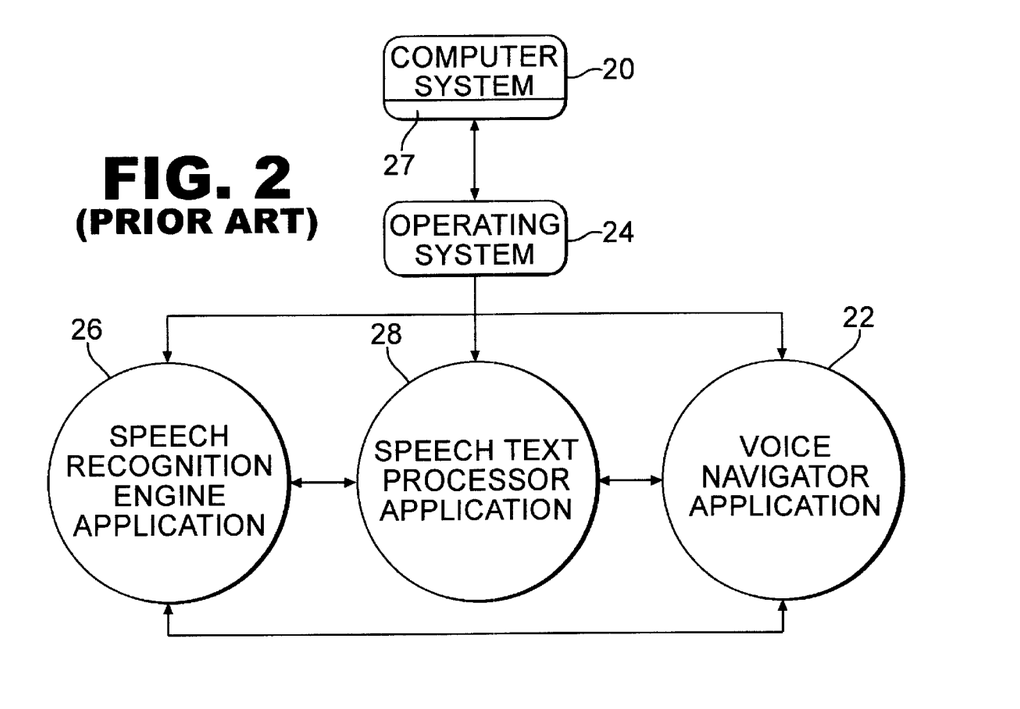
FIG. 2 is a block diagram showing a typical high level architecture for the computer system in FIG. 1.

FIG. 2 illustrates a typical architecture for a speech recognition system in computer 20. As shown in FIG. 2, the system typically includes an operating system 24 and a speech recognition engine application 26. In the example shown, a speech text processor application 28 and a voice navigator application 22 are also provided. However the invention is not limited in this regard and the speech recognition engine application 26 can be used with any other application program which is to be voice enabled. In FIG. 2, the speech recognition engine 26, speech text processor 28 and the voice navigator 22 are shown as separate application programs. It should be noted however that the invention is not limited in this regard, and these various application programs could be implemented as a single, more complex applications program. For example the speech recognition application 26 could be combined with the speech text processor application or with any other application to be used in conjunction with the speech recognition application. Also, if no other speech controlled application programs are to be operated in conjunction with the speech text processor application and speech recognition engine, then the system can be modified to operate without the voice navigator application. The voice navigator primarily helps coordinate the operation of the speech recognition engine application.

In a preferred embodiment which shall be discussed herein, operating system 24 is one of the Windows family of operating systems, such as Windows NT, Windows 95 or Windows 98 which are available from Microsoft Corporation of Redmond, Wash. However, the system is not limited in this regard, and the invention can also be used with any other type of computer operating system. The system as disclosed herein can be implemented by a programmer, using commercially available development tools for the operating systems described above. As shown in FIG. 2, computer system 20 includes a computer memory device 27, which is preferably comprised of an electronic random access memory and a bulk data storage medium, such as a magnetic disk drive.

Audio signals representative of sound received in microphone 30 or contained in a recording on a transcription device are processed within computer using conventional computer audio circuitry so as to be made available to the operating system 24 in digitized form. The audio signals received by the computer are conventionally provided to the speech recognition engine application 26 via the computer operating system 24 in order to perform speech recognition functions. As in conventional speech recognition systems, the audio signals are processed by the speech recognition engine 26 to identify words spoken by a user into microphone 30 or words spoken by a user and recorded on a transcription device.

Audio that is recorded by a transcription device can be transferred to the speech recognition system in a number of ways. The transcription device is connected to the computer system using a suitable cable. In the case of digital transcription devices, a digital output on the transcription device can be connected to a digital input on the computer system. Alternatively, in the case of analog transcription devices, a cable can be connected from the transcription device's analog output to the analog input of the computer system's sound board. One variety of transcription device contains software which cooperates with the speech recognition system. Such software enables the speech recognition system to view dictation recordings located on transcription devices as computer files similar to the manner in which files can be viewed on a magnetic disk drive. For example, when properly connected to the computer system, the transcription device can appear to the speech recognition application as a bulk data storage medium, such as a magnetic. disk drive. In this case, the user may open a dialog box while in the speech recognition application and select the dictation recording to transfer to the speech recognition system. The dictation recording is then transferred from the dictation device, to the computer system, and to the speech recognition system as a computer file.

Another variety of transcription device comes with software tools that copy the dictation recording to the computer system. In this case, the transcription device is connected to the computer system in the manner described above. The software tools provided with the transcription device can be used to transfer the dictation recording from the transcription device to the computer system, storing the dictation recording as a computer file. Then, through the use of a dialog box in the speech recognition application, the user can select the desired dictation recording which appears as a computer file from the computer system's hard drive.

Regardless of how the dictation recording is transferred, it should be appreciated that either a digital recording or an analog recording can be transferred. In the case of an analog recording, as the transcription device plays the dictation recording, the computer system can digitally record the dictation recording. The resulting computer file containing the dictation recording can then be made available to the speech recognition system.

Figure 3:
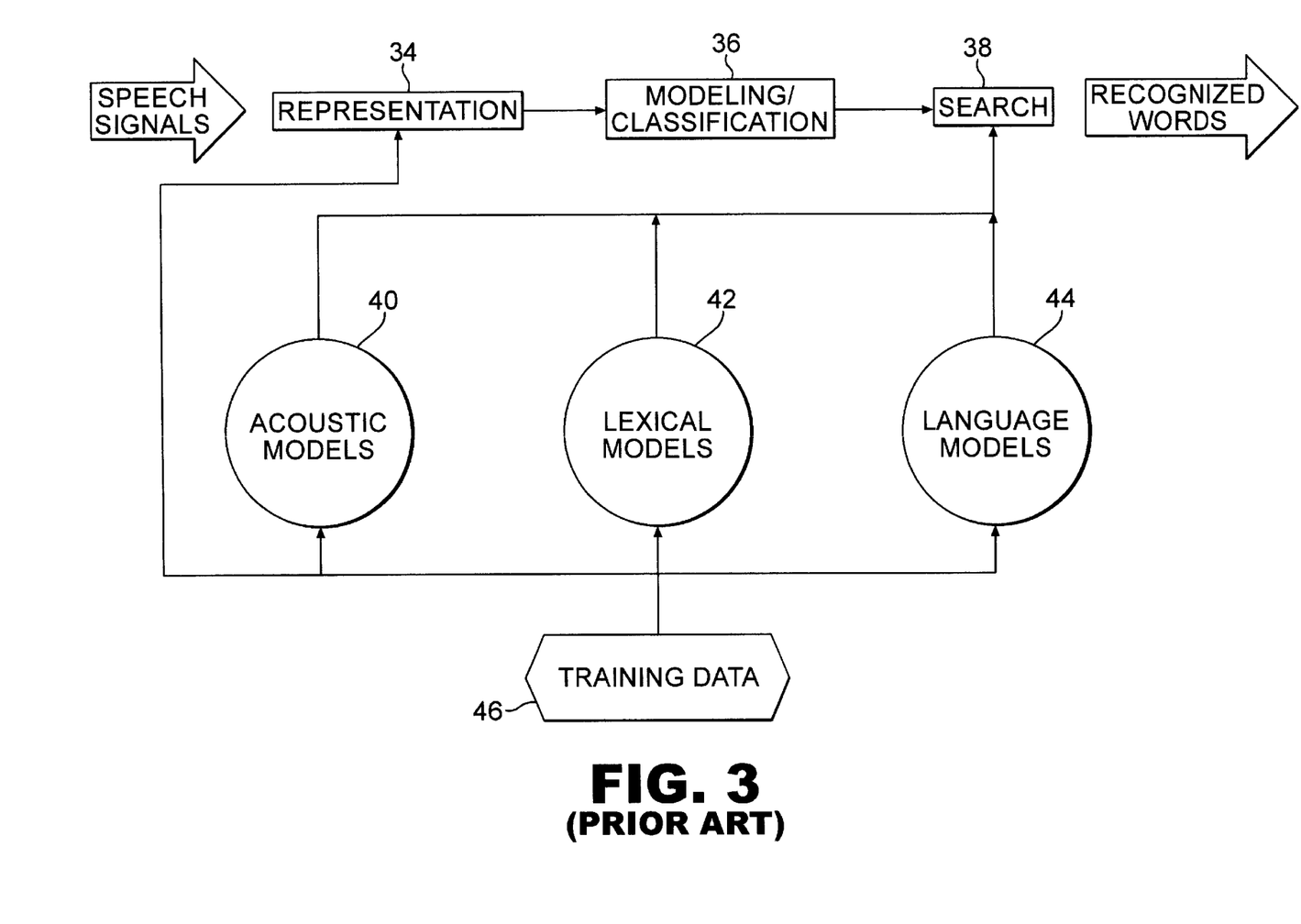
FIG. 3 is a block diagram showing a typical architecture for a speech recognition engine.

FIG. 3 is a block diagram showing typical components which comprise speech recognition application 26. As shown in FIG. 3 the speech recognition engine 26 receives a digitized speech signal from the operating system. The signal is subsequently transformed in representation block 34 into a useful set of data by sampling the signal at some fixed rate, typically every 10–20 msec. The representation block produces a new representation of the audio signal which can then be used in subsequent stages of the voice recognition process to determine the probability that the portion of waveform just analyzed corresponds to a particular phonetic event. This process is intended to emphasize perceptually important speaker independent features of the speech signals received from the operating system. In modeling/classification block 36, algorithms process the speech signals further to adapt speaker-independent acoustic models to those of the current speaker. Finally, in search block 38, search algorithms are used to guide the search engine to the most likely words corresponding to the speech signal. The search process in search block 38 occurs with the help of acoustic models 40, lexical models 42 and language models 44.

Figure 4A:
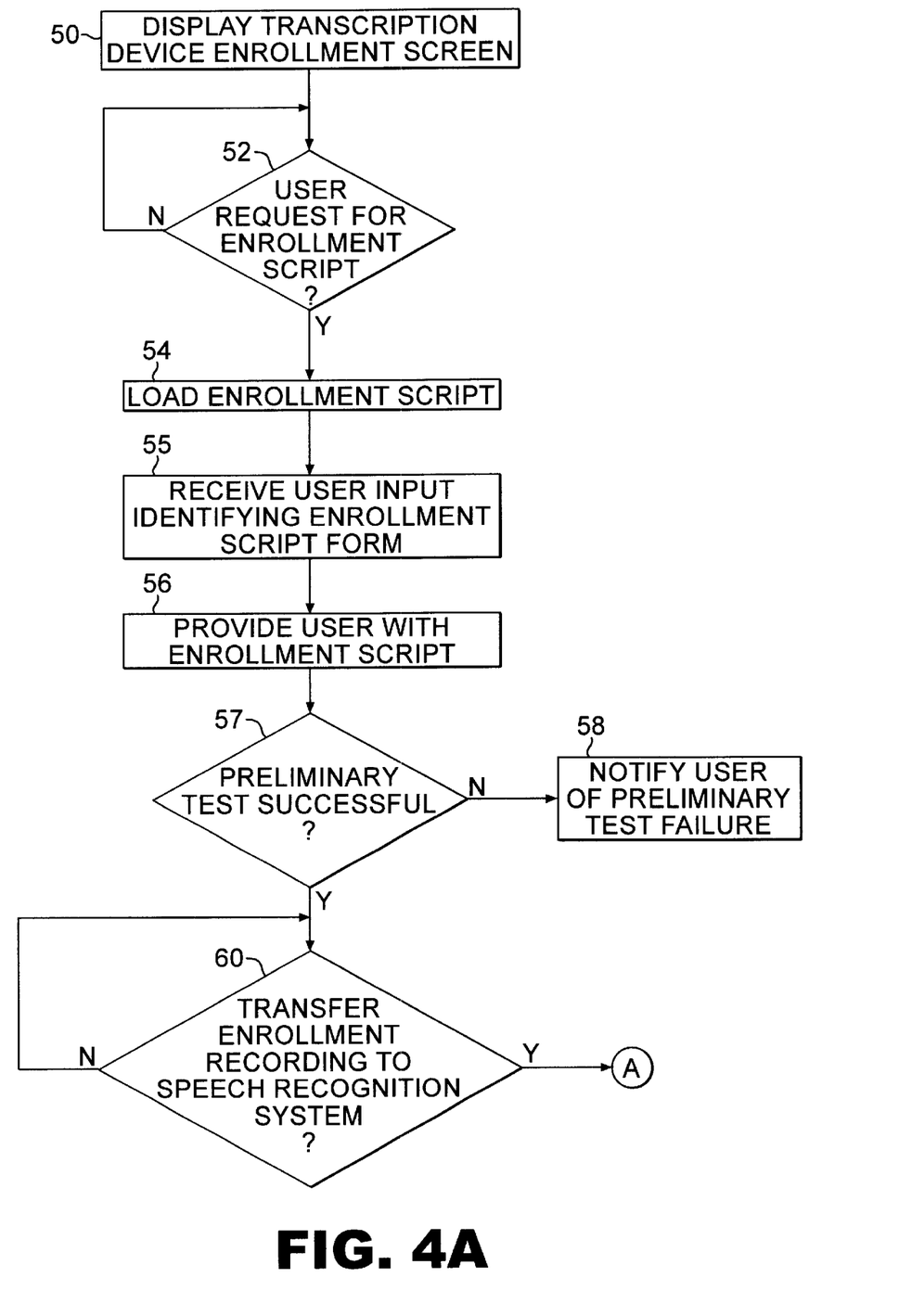
FIGS. 4A and 4B taken together are a flow chart illustrating a process for enrolling a user using a transcription device.
Figure 4B:
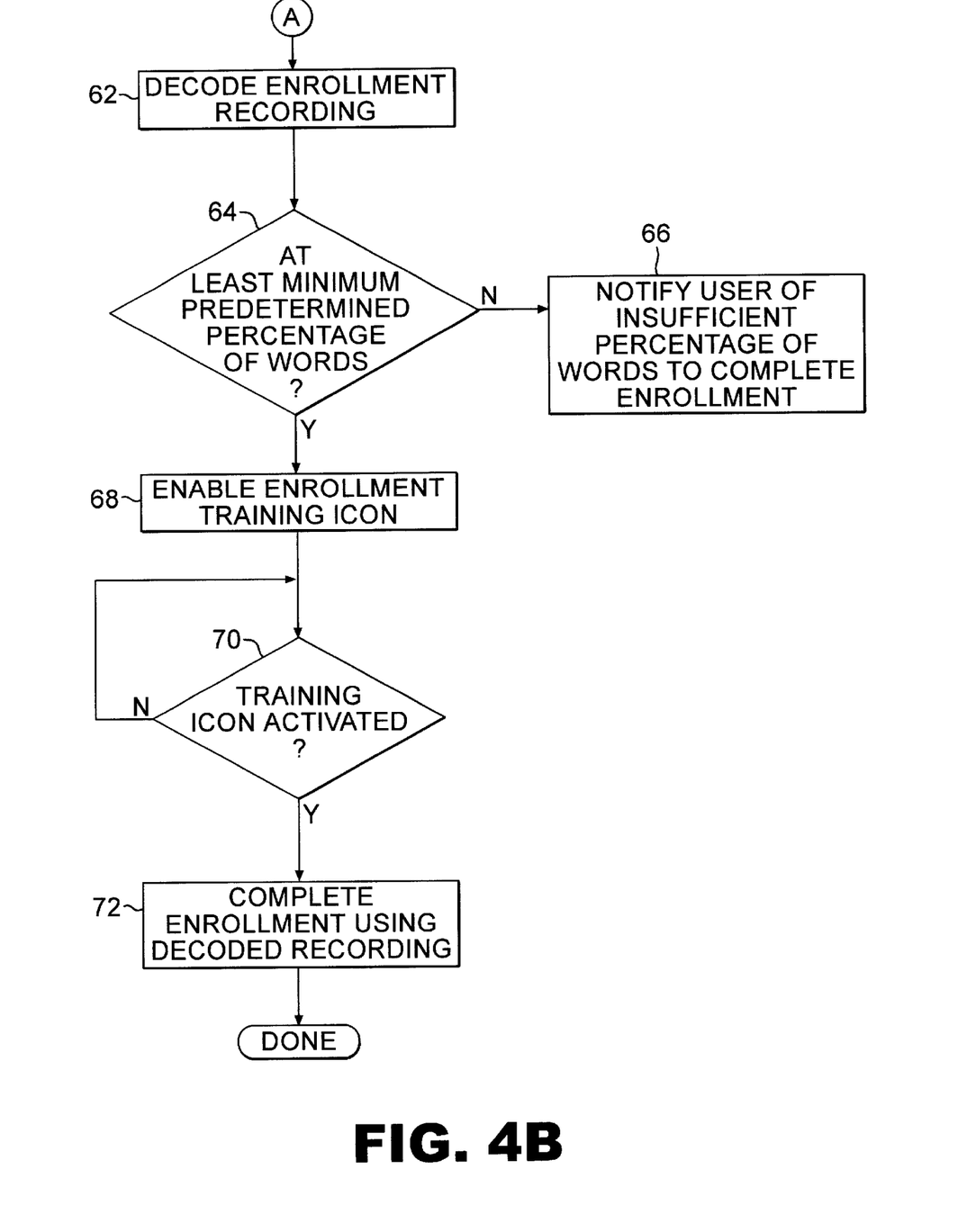

FIGS. 4A and 4B taken together are a flow chart illustrating a process for enrolling a user using a transcription device. According to a preferred embodiment, the system is placed into a user enrollment mode in response to a user input requesting enrollment using a transcription device. The user input can be in any suitable form, including but not limited to the form of a spoken user utterance received by microphone 30, a user keyboard entry, or input from a pointing device such as a mouse 21. In response to a user input requesting enrollment on a transcription device, in FIG. 4A in step 50, the speech recognition system presents a transcription device enrollment screen or graphical user interface (GUI) to the user. Several different types of GUIs can be presented to the user. For example, for more experienced computer users, the system can present one main GUI which the user can invoke several times. Each time the user invokes the GUI, the user can perform another step of the inventive method described herein. Alternatively, the user can be presented with the first of a series of GUIs comprising an automated sequence of controls referred to as a Wizard which guides the user through the inventive method described herein in a step by step manner. It being understood that many possible permutations and combinations of interface screens or GUIs are possible and that the invention is not so limited by any one specific GUI configuration.

In step 52, the system awaits a user input requesting an enrollment script. The user input can be in any suitable form, including but not limited to the form of a spoken user utterance received by microphone 30, a user keyboard entry, or input from a pointing device such as a mouse 21. As shown in step 52, if the user does not request an enrollment script, then the system continually loops through step 52. If the user does request an enrollment script, then the system stops looping and continues on to step 54.

In step 54, based upon the user's previous request to enroll on a transcription device, the system recalls one or more enrollment script choices from computer memory. The user can choose an enrollment script that personally appeals to the user.

In step 55, after the user chooses a personally appealing enrollment script, the speech recognition system presents the user with several choices as to how the system will provide the user with the enrollment script. For example, the system can print the enrollment script, display the enrollment script, or copy the enrollment script to a file on magnetic media for the user to transport and print or display on another computer system.

In step 56, the system provides the enrollment script to the user in the form specified by the user in step 55. With the enrollment script, the user is also provided with instructions relating to proper dictation of the enrollment script.

In step 57 the system performs preliminary testing. This feature does not enroll the user. Rather, while still in the local audio environment and in a fast efficient manner, the preliminary test can verify that the transcription device is functioning properly, and that the speech recognition system is able to extract usable audio data from a recording made by that transcription device. Thus, the user is alerted to any problems with the transcription device while still in the local audio environment.

The preliminary testing involves instructing the user to dictate test sentences into the transcription device while in the local audio environment. Test sentences, which are a short version of an enrollment script for testing purposes, can be provided to the user with the enrollment script in step 56. After dictation of the test sentences, the user transfers the resulting test recording to the computer system. The transcription device output must first be connected to the computer system via an appropriate cable having proper connectors. Digital transcription devices can be connected to a digital input on the computer system, while analog devices can be connected to the analog input on a sound board of a computer system. Transfer of a recording from a transcription device to the speech recognition system can be accomplished in a number of ways and depends upon the particular transcription device used. For example, some transcription devices are equipped with software to cooperate with the speech recognition system so that the recording can be directly imported into the speech recognition system from the transcription device with the aid of a dialog box or other GUI. In other cases, the user must use a transcription device's accompanying software tools to first transfer the recording from the transcription device to the computer system. After transfer of the recording to the computer system, the speech recognition system can import the recording in response to a user input identifying a file containing the user dictation. Additionally, it should be appreciated that an analog recording can be played into a sound card operatively connected to the computer system so that a digital copy of the analog recording can be made. This digital copy can then be imported into the speech recognition system.

Once the user identifies the preliminary test recording, then the preliminary test feature imports the test recording into the speech recognition system, decodes the recording, and checks the recording for usable audio data. If the test fails, then in step 58 the user is notified of the problem. Also in step 58, the user can be given potential solutions for correcting the problem. If the test is successful, then the user is notified that the test was successful, and the system proceeds to step 60.

In step 60, the system awaits a user input requesting the transfer of an enrollment recording from a transcription device containing user dictation of at least a portion of the enrollment script. Step 60 can be implemented by the system in a variety of ways. The system can be suspended so that upon restarting the enrollment process, the system recalls where in the process the user suspended the system. Alternatively, the system can continuously loop through step 60 if there is no request to transfer the enrollment recording.

Step 60 gives the user time to dictate at least a portion of the enrollment script into the transcription device in the distinct audio environment where the user intends to use the transcription device. The term "distinct audio environment" is used to refer to any audio environment that differs in any respect from the local audio environment where the speech recognition system is operated. For example, if a user were to stand only several feet from the location where the user was initially enrolled in the speech recognition system, a distinct audio environment would result. As an aside, it should be noted that the system is not limited by the type of transcription device used to make the enrollment recording. Any suitable method of recording audio data, including but not limited to digital and analog devices, can be used to record the user dictation of the enrollment script.

After user dictation of at least a portion of the enrollment script, it should be appreciated that the enrollment recording can be transferred to the computer system or the speech recognition system in the same manner as described in step 56.

Continuing with step 60, in response to a user input requesting importation of the enrollment recording, the user can be presented with a list of enrollment recordings found on the transcription device, or alternatively, already located in the computer system. The user input can be in any suitable form, including but not limited to the form of a spoken user utterance received by microphone 30, a user keyboard entry, or input from a pointing device such as a mouse 21. In response to a user input identifying an enrollment script to import, the speech recognition system imports the enrollment recording into the speech recognition system. The user input can be in any suitable form, including but not limited to the form of a spoken user utterance received by microphone 30, a user keyboard entry, or input from a pointing device such as a mouse 21.

Next the system proceeds from step 60 in FIG. 4A to jump circle A. Proceeding to FIG. 4B, from jump circle A the system continues to step 62. In step 62 the system decodes the enrollment recording into text for comparison to the enrollment script. During the decoding process, the system can determine whether the enrollment recording is missing sentences from the enrollment script. Further, the system can determine whether the enrollment recording contains repeated or duplicate sentences from the enrollment script. In either case, the speech recognition system can successfully decode the enrollment recording. This feature accommodates user error such as when the user accidentally skips several sentences, accidentally repeats a sentence from the enrollment script more than one time, or loses his or her place in the enrollment script while dictating the enrollment script to the transcription device.

In step 64, the system determines whether at least a minimum predetermined percentage of words necessary for training the speech recognition system was recognized from the enrollment recording. If so, then the system proceeds to step 68. It should be appreciated that if more than the minimum predetermined percentage of words was recognized from the enrollment recording, then system performance can improve. In that case, the system also continues to step 68. If less than the minimum predetermined percentage of words is recognized, then the system proceeds to step 66 where the user is notified that an insufficient, percentage of words was recognized. In step 66 the system can also provide the user with additional information on how to correct the problem. For example, the user can be notified that there may be a malfunction with the transcription device used to make the enrollment recording, or that the audio quality of the enrollment recording was not adequate for training the speech recognition system. Additionally, if the first several sentences of the enrollment recording are not recognized by the system, then the system assumes that the user began dictation from a different sentence within the enrollment script than expected. In this case the system can notify the user of the problem, notify the user of the expected sentence number, and request the user to enter the sentence number from the enrollment script corresponding to the first sentence in the enrollment recording.

In step 66, in the case where a transcription device does not have the capacity to store enough dictation for the system to recognize the minimum predetermined percentage of words from the enrollment script, the system can notify the user that no problem was found, but that additional dictation of the enrollment script is necessary. In this case, the system asks the user to dictate the next portion of the enrollment script into the dictation device in the distinct audio environment in which the user dictated the first portion of the enrollment script. The user can then transfer the subsequent enrollment recording into the speech recognition system and build upon the previously transferred recording so that the minimum predetermined percentage of words may eventually be recognized for training. In this case, each time the user transfers a subsequent recording of the enrollment script, the system again decodes the enrollment recording, checks for audio quality, and checks for the minimum predetermined percentage of words and sentence order.

If the system recognizes a minimum predetermined percentage of words, the system proceeds to step 68. In step 68, the system can enable a user activatable icon, which when activated, initiates the training process. For example, the user activatable icon can be a user activatable button on a GUI.

In step 70, the system awaits a user input requesting training using the enrollment recording. Because the training process is somewhat time consuming, the system can enter a loop or otherwise suspend operation until the user decides to begin training at some future time.

In step 72, in response to a user input activating a user activatable icon, the system completes the enrollment process by training the speech recognition system. The training process involves the creation of a personal voice model that is composed of acoustic models which are tailored to the user's manner of speaking.

Figure 5A:
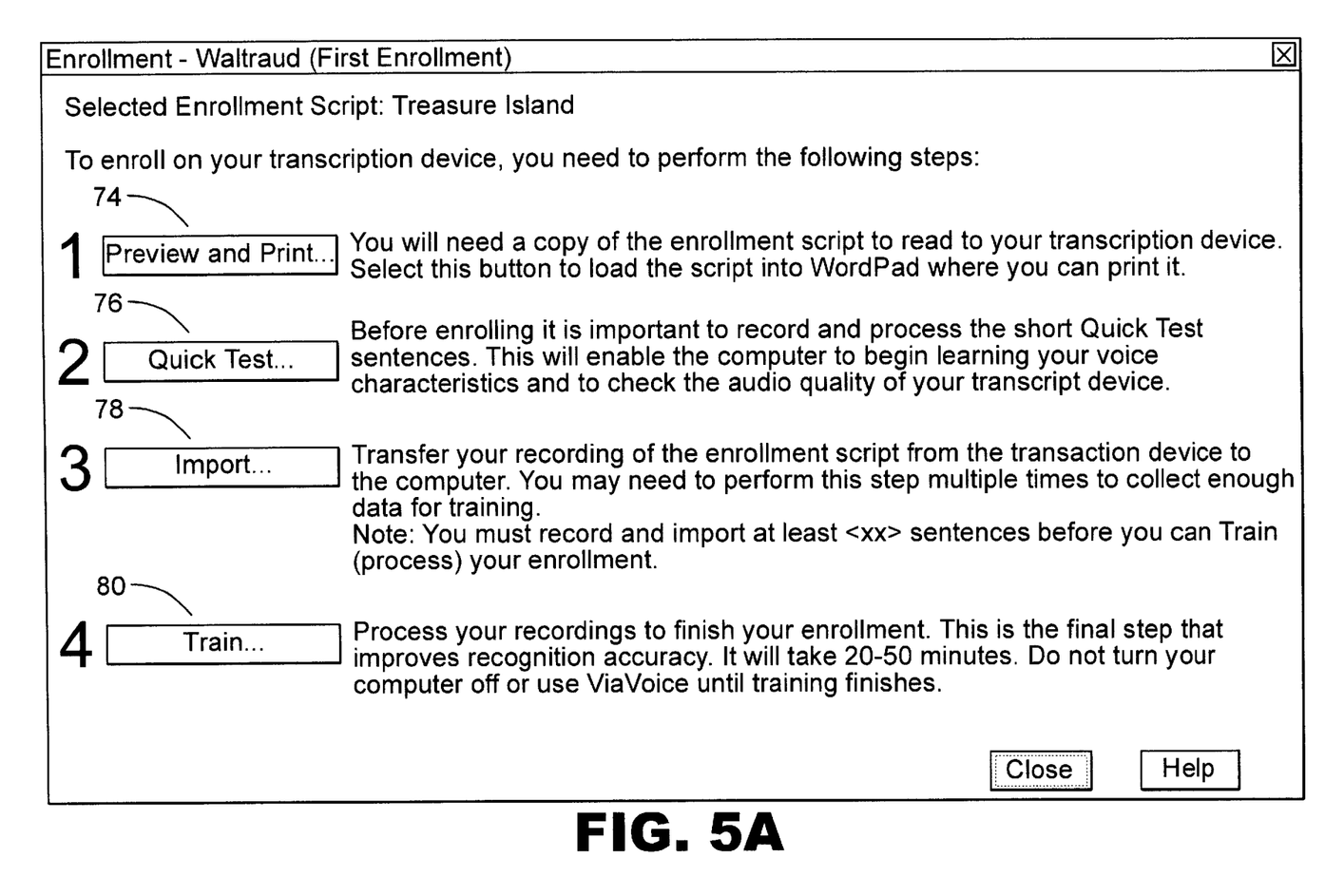
FIGS. 5A through 5H depict exemplary graphical user interfaces for guiding a user through the enrollment process.

FIG. 5A depicts an exemplary GUI for experienced computer users for transcription device enrollment in accordance with step 50 of the inventive method. For example, a user can invoke the GUI a first time and activate user activatable button 74 to preview and print enrollment scripts. Upon invoking the GUI a second time, the user can activate user activatable button 76 to initiate the preliminary testing function. Upon invoking the GUI a third time, the user can activate user activatable button 78 to initiate importation or transfer of the enrollment recording. Upon invoking the GUI a fourth time, the user can activate user activatable button 80 to initiate training of the speech recognition system. Additionally, the system can disable each of buttons 76, 78, and 80 until the user successfully completes the activity associated with the previous button. Upon successful completion of an activity associated with a specific button, the system can then enable the next button. For example, after successful completion of printing an enrollment script in response to user activation of button 74, the system can display a green check next to button 74 indicating that an enrollment script has been printed. Further, the system would then enable button 76.

Figure 5B:
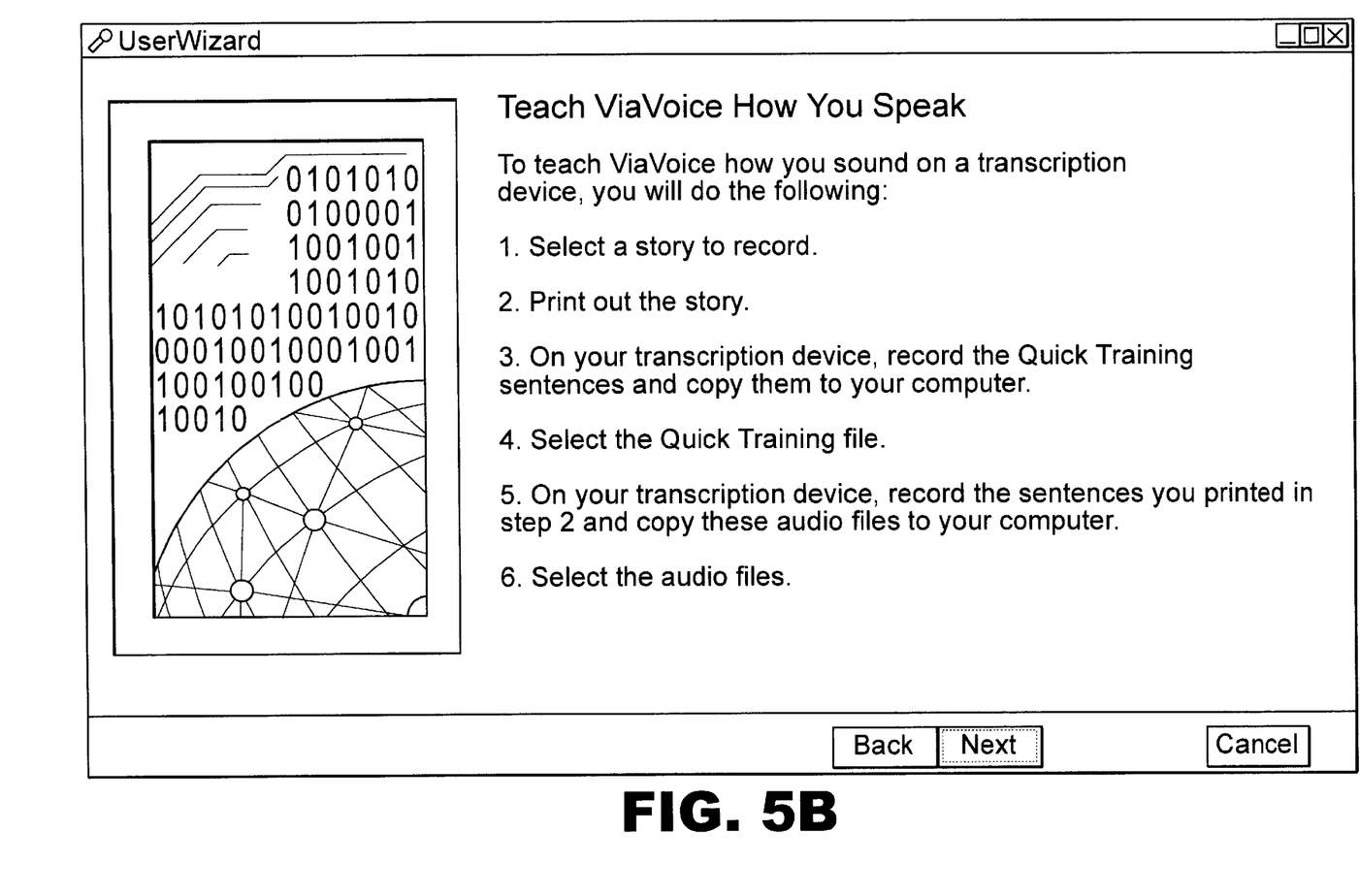

FIG. 5B depicts the first of a series of exemplary GUIs comprising an automated sequence of controls referred to as a Wizard which guides the user through the enrollment process in a step by step manner in accordance with step 50 of the inventive method. The exemplary GUI depicted in FIG. 5B gives the user general instructions pertaining to the entire enrollment process.

Figure 5C:
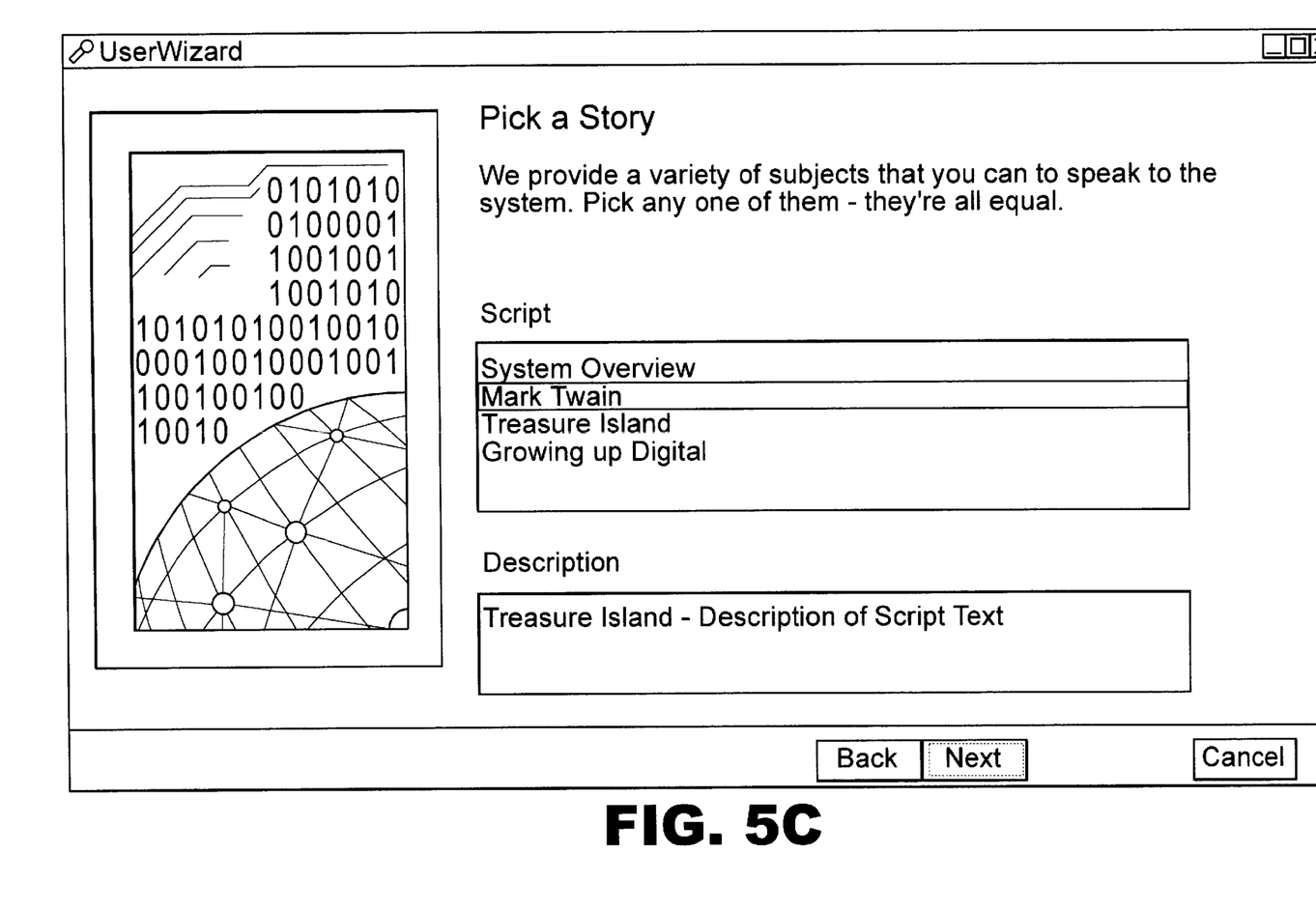

FIG. 5C depicts an exemplary graphical user interface which offers the user several alternate enrollment script choices in accordance with step 54 of the inventive method.

Figure 5D:
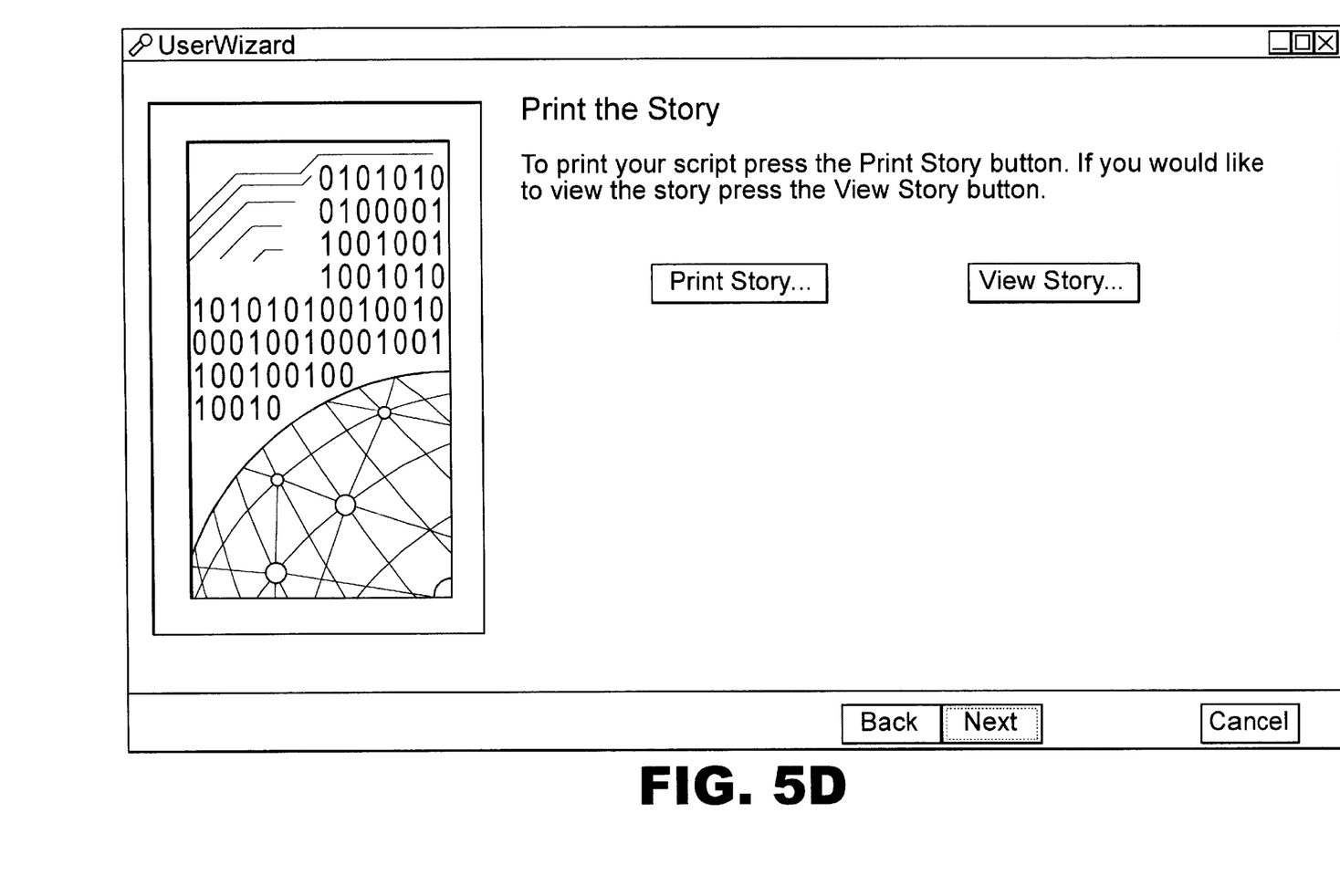

FIG. 5D depicts an exemplary GUI with user activatable buttons for either printing the enrollment script or viewing the enrollment script in accordance with step 55 of the inventive method.

Figure 5E:
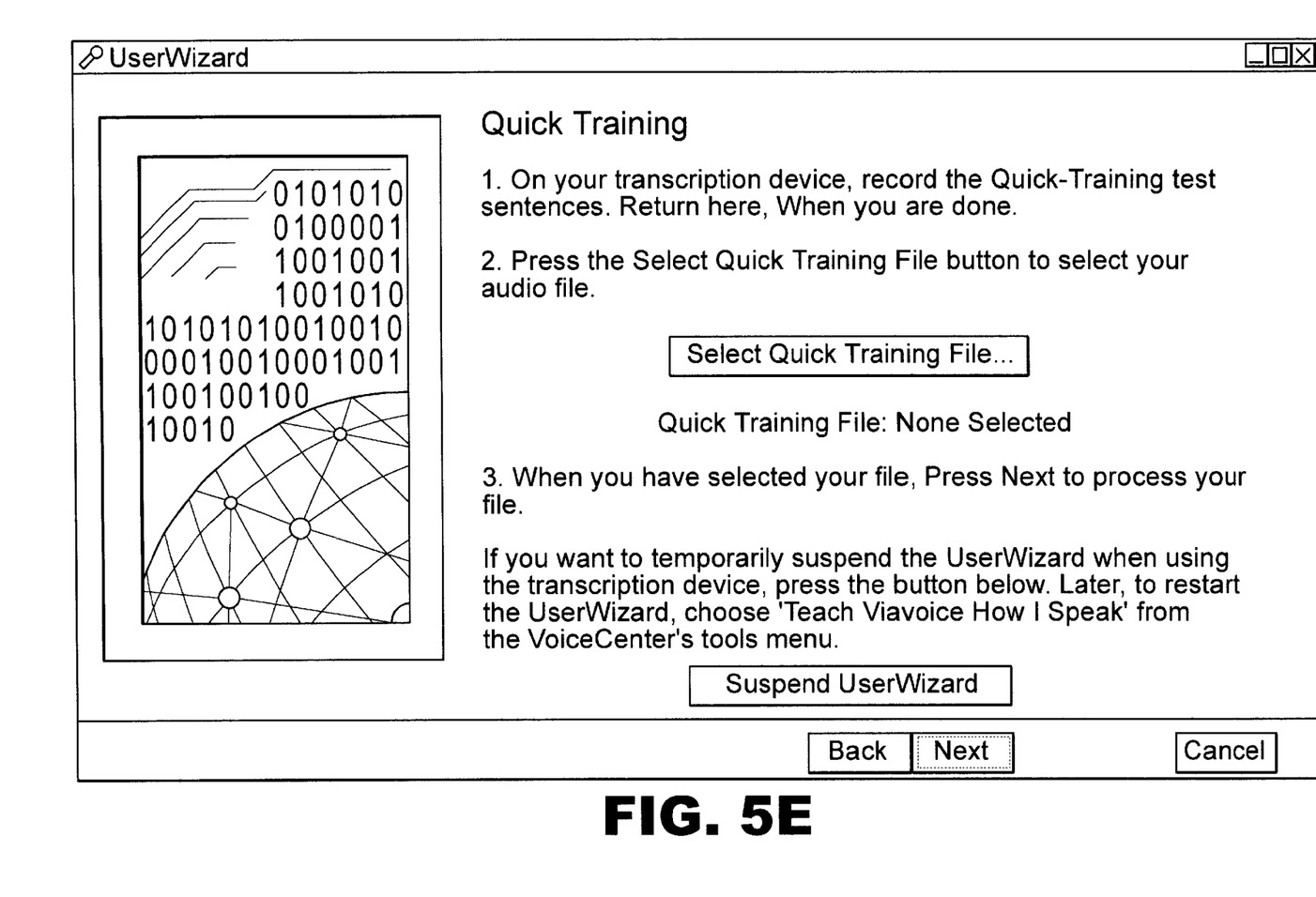

FIG. 5E depicts an exemplary GUI for performing a preliminary test in accordance with step 57 of the inventive method.

Figure 5F:
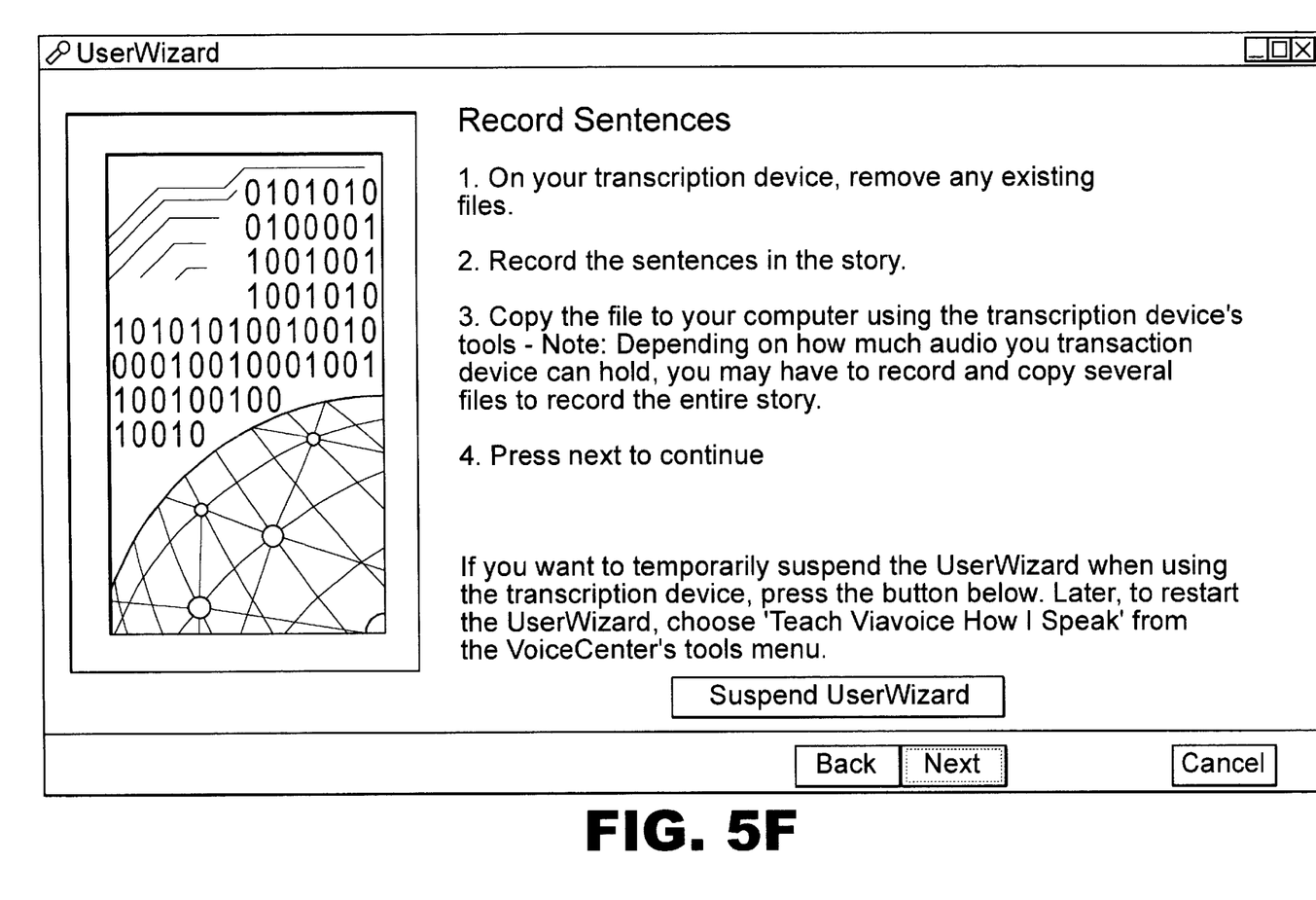

FIG. 5F depicts an exemplary GUI which instructs the user how to properly. record the enrollment script and additionally contains a user activatable button to suspend the Wizard until completion of user dictation of at least a portion of the enrollment script in accordance with step 60 of the inventive method.

Figure 5G:
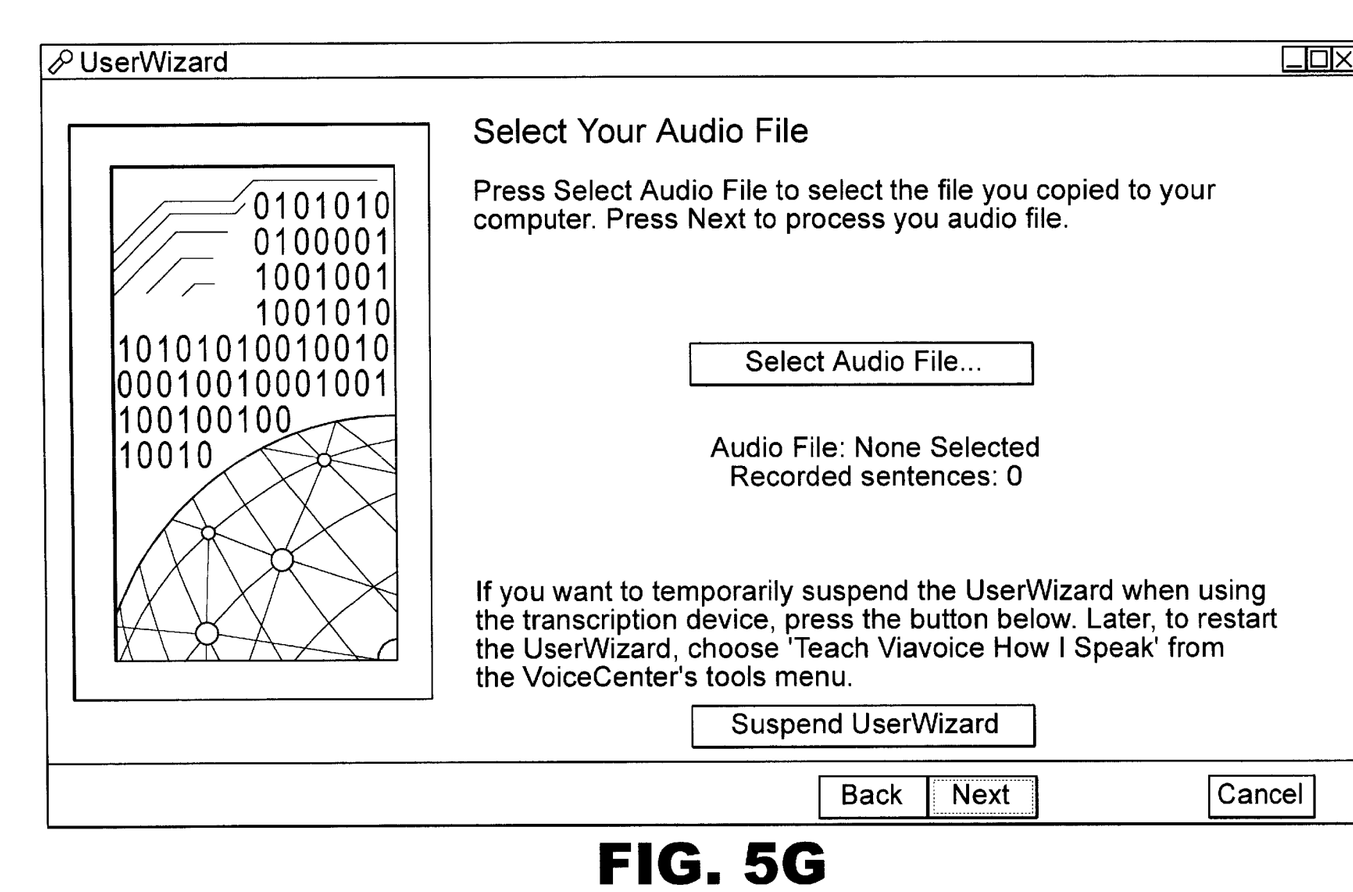

FIG. 5G depicts an exemplary GUI asking the user to select an audio file to import into the speech recognition system in accordance with step 60 of the inventive method. For example, in response to activation of a user activatable button, the system can present the user with a dialog box so that the user can identify an enrollment recording.

Figure 5H:
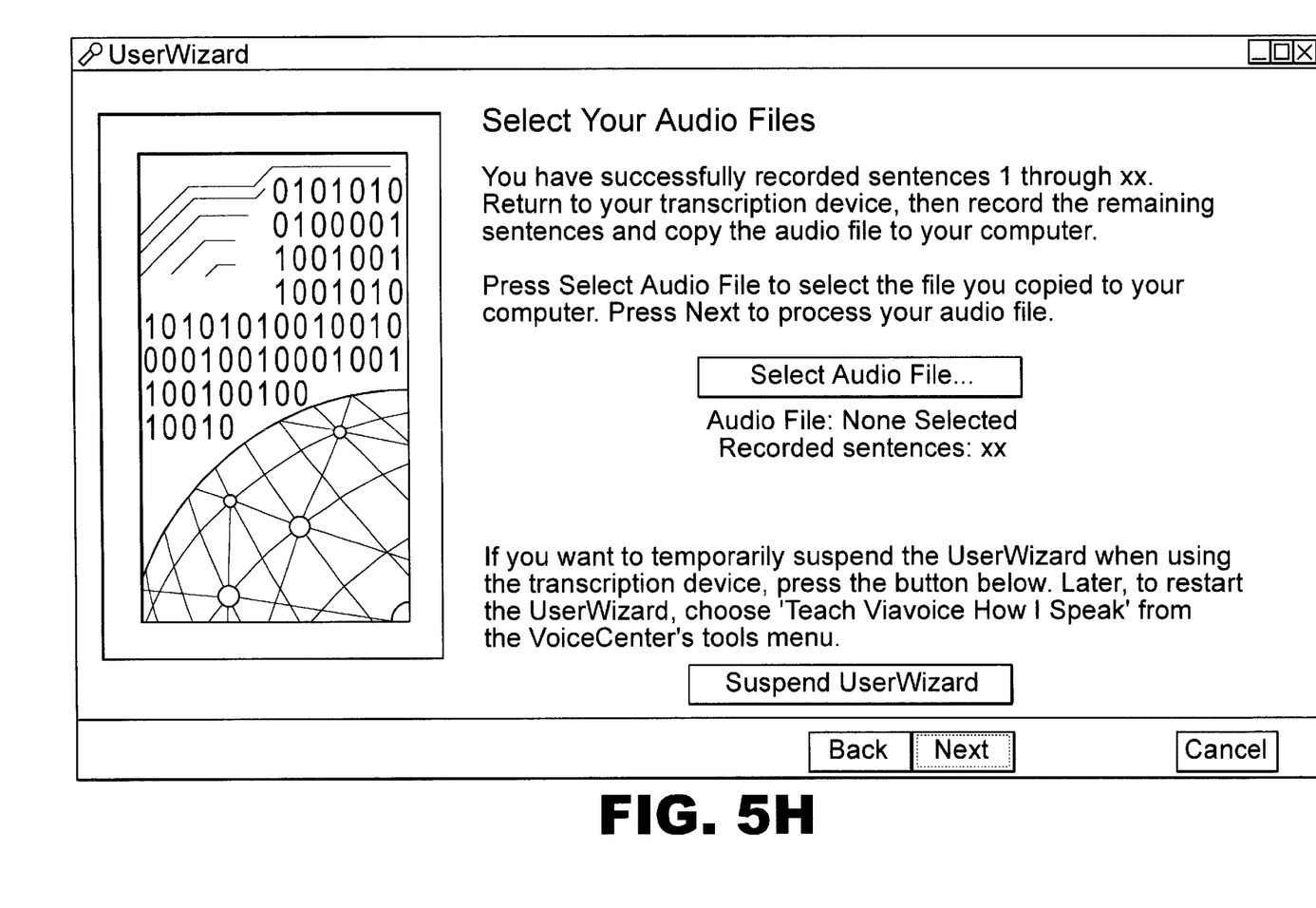

FIG. 5H depicts an exemplary GUI for use after a file has been decoded. The GUI can notify the user as to how many sentences from the enrollment recording were recognized.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. In a computer speech recognition system, a method for enrollment of a user comprising:

providing a user with an enrollment script;

uploading a recording of a dictation session in which said user has dictated at least a portion of said enrollment script, wherein said recording is made with, and uploaded from a portable transcription device;

enrolling said user in said speech recognition system by decoding said recording and training said speech recognition system to construct at least one location specific and transcription device specific personal voice model; and, enabling a user activatable icon for initiating said training process using said recording, if said recording contains a minimum predetermined percentage of words.

2. The method of claim 1 wherein said dictation session occurs in an audio environment which is distinct from a local audio environment in which said speech recognition system is operated.

3. The method of claim 2 wherein said recording is made with a digital voice recorder.

4. The method of claim 2 wherein said recording is made with an analog voice recorder.

5. The method of claim 1 further comprising the step of:

comparing said recording to said enrollment script to determine if said recording contains a minimum predetermined percentage of words contained in said enrollment script.

6. In a computer speech recognition system, a system for enrollment of a user comprising:

means for providing a user with an enrollment script;

means for uploading a recording of a dictation session in which said user has dictated at least a portion of said enrollment script, wherein said recording is made with, and uploaded from a portable transcription device;

means for enrolling said user in said speech recognition system by decoding said recording and training said speech recognition system to construct at least one location specific and transcription device specific personal voice model; and,     means for enabling a user activatable icon for initiating said training process using said recording, if said recording contains a minimum predetermined percentage of words.

7. The system of claim 6 wherein said dictation session occurs in an audio environment which is distinct from a local audio environment in which said speech recognition system is operated.

8. The system of claim 7 wherein said recording is made with a digital voice recorder.

9. The system of claim 7 wherein said recording is made with an analog voice recorder.

10. The system of claim 6 further comprising the step of:

means for comparing said recording to said enrollment script to determine if said recording contains a minimum predetermined percentage of words contained in said enrollment script.

11. A machine readable storage, having stored thereon a computer program having a plurality of code sections executable by a machine for causing the machine to perform the steps of:

providing a user with an enrollment script;

uploading a recording of a dictation session in which said user has dictated at least a portion of said enrollment script, wherein said recording is made with, and uploaded from a portable transcription device;

enrolling said user in said speech recognition system by decoding said recording and training said speech recognition system to construct at least one location specific and transcription device specific personal voice model; and,     enabling a user activatable icon for initiating said training process using said recording, if said recording contains a minimum predetermined percentage of words.

12. The machine readable storage according to claim 11 wherein said dictation session occurs in an audio environment which is distinct from a local audio environment in which said speech recognition system is operated.

13. The machine readable storage according to claim 12 wherein said recording is made with a digital voice recorder.

14. The machine readable storage according to claim 12 wherein said recording is made with an analog voice recorder.

15. The machine readable storage according to claim 11 for causing the machine to perform the further step of:

comparing said recording to said enrollment script to determine if said recording contains a minimum predetermined percentage of words contained in said enrollment script.

\* \* \* \* \*